United States Patent Office

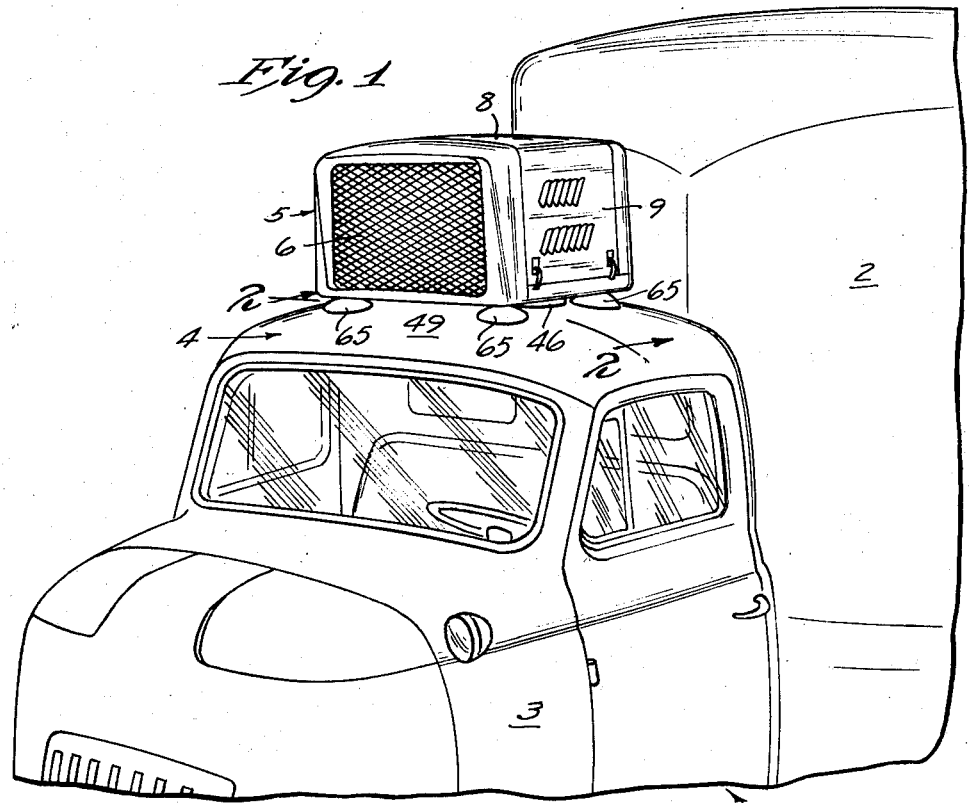
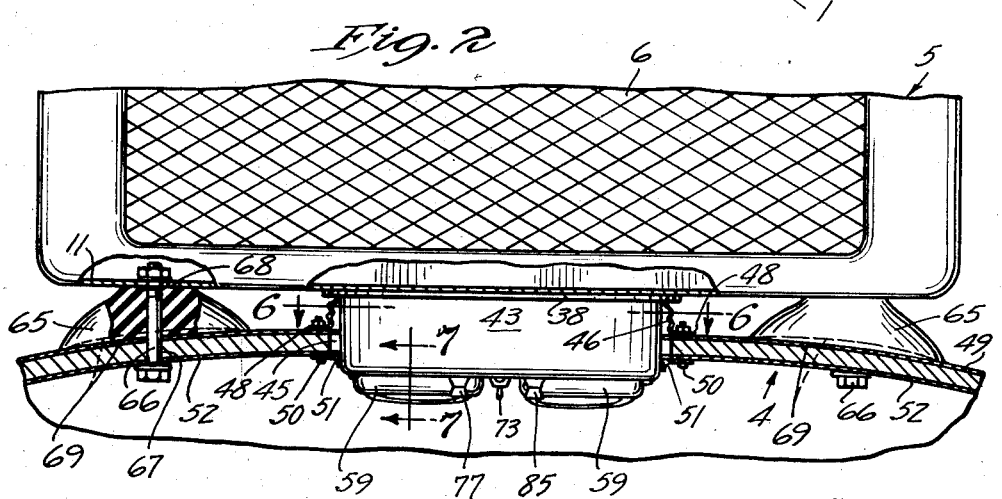

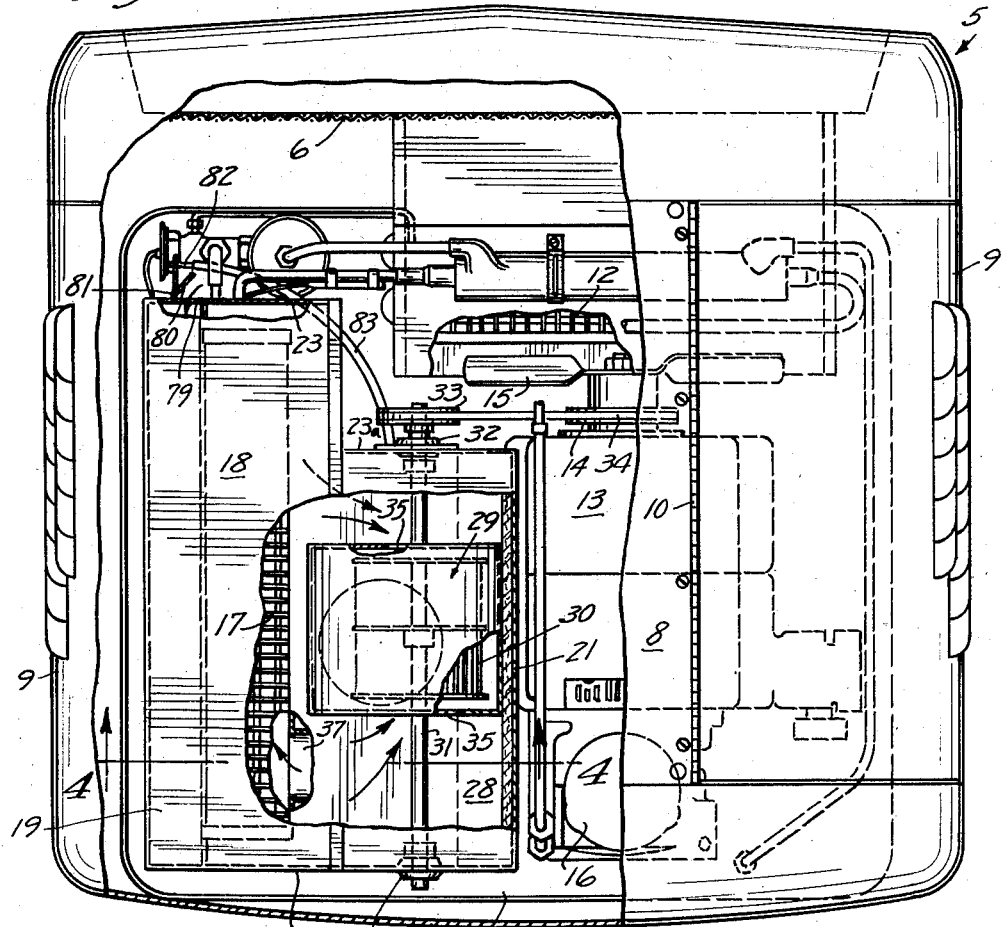

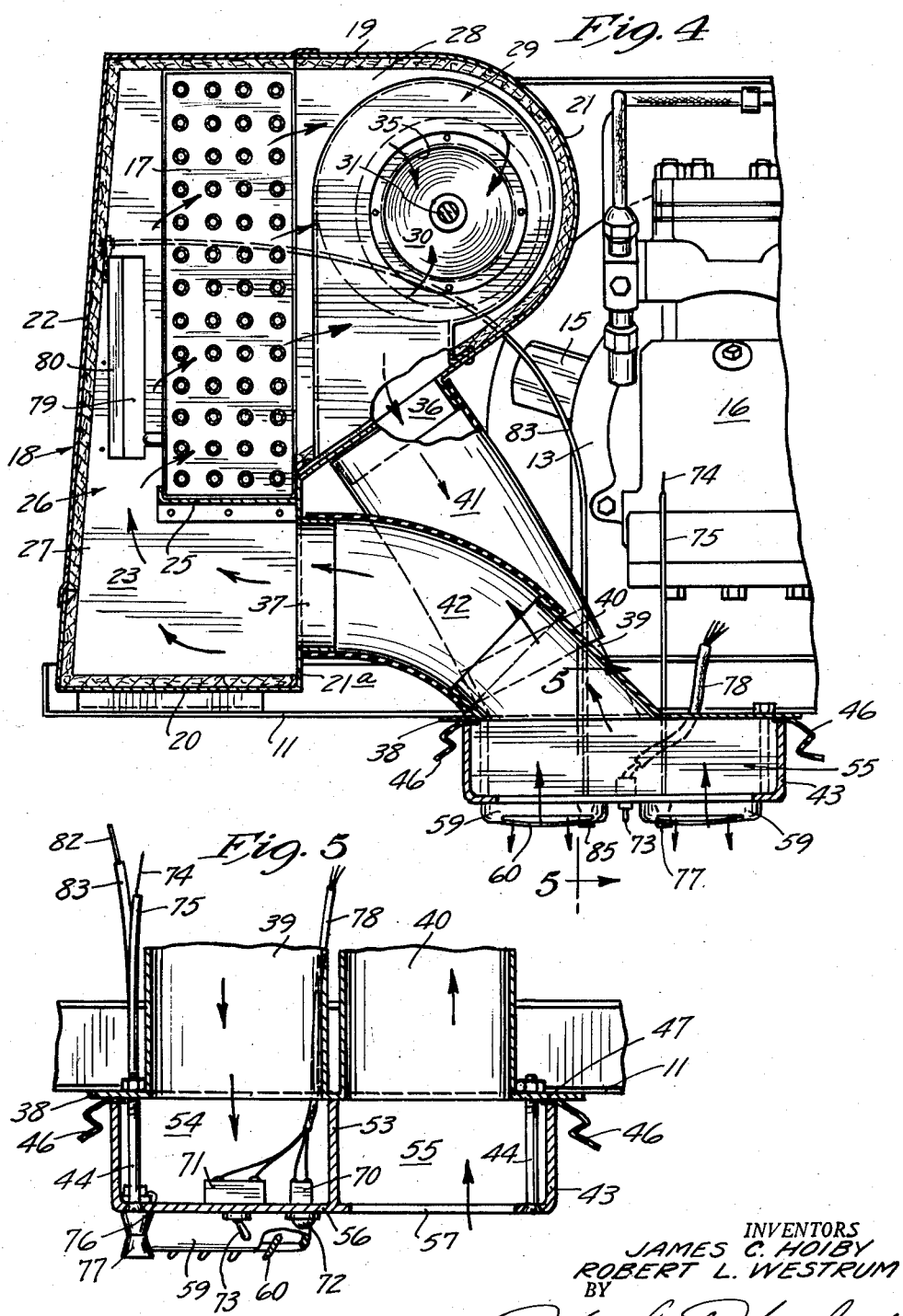

2,869,333
Patented Jan. 20, 1959

2,869,333

AIR CONDITIONER FOR AUTOMOTIVE VEHICLES AND CONTROLS THEREFOR

James C. Hoiby and Robert L. Westrum, Minneapolis, Minn., assignors to D. W. Ovan & Sons, Inc., Minneapolis, Minn., a corporation of Minnesota Application August 1, 1956, Serial No. 601,536

4 Claims. (Cl. 62—239)

Our invention relates generally to air conditioning apparatus, and more specifically to an air conditioning device for use in conditioning and cooling air in a given compartment of an automotive vehicle.

An important object of our invention is the provision of an air conditioning unit which may be mounted on an exterior wall surface of an automotive vehicle, such as on the roof thereof, and which is adapted to circulate air through an opening in the wall on which the unit is mounted, to and from the interior of the vehicle.

Another object of our invention is the provision of a novel arrangement wherein the controls for the various components of the air conditioning apparatus are carried by a portion of the device projecting into the passenger compartment of the vehicle and within easy reach of the operator, whereby to eliminate the installing of special controls on the vehicle proper.

Another object of our invention is the provision of an air conditioning unit which may be installed on a vehicle or removed therefrom, and having a minimum of operating parts to be connected to or disconnected from the vehicle.

A still further object of our invention is the provision of novel mounting elements whereby the above device may be mounted on a curved wall surface, said mounting elements being movable in directions to cause the same to conform both to the curvature of said wall surface and to the engaged surface portion of the air conditioning device.

Still another object of our invention is the provision of an air conditioning unit having a tubular head adapted to project through an enlarged opening in the wall of a given vehicle compartment, said head defining a delivery passage for conditioned air to said compartment and a return passage for air from said compartment to the evaporator of said unit, and having novel adjustable means for guiding conditioned air in desired directions in said compartment.

The above and still further highly important objects and advantages of our invention will become apparent from the following detailed specification, appended claims, and attached drawings.

Referring to the drawings, which illustrate the invention, and in which like reference characters indicate like parts throughout the several views:

Fig. 1 is a fragmentary view in perspective of an ordinary vehicle showing our novel air conditioning unit mounted on the roof of the cab or operator's compartment of the vehicle;

Fig. 2 is a fragmentary view partly in front elevation and partly in section, taken substantially on the line 2—2 of Fig. 1;

Fig. 3 is a view in top plan of the air conditioning device of Fig. 1, some parts being broken away and some parts being shown in section;

Fig. 4 is an enlarged fragmentary view in section taken substantially on the line 4—4 of Fig. 3;

Fig. 5 is an enlarged fragmentary detail in section taken substantially on the line 5—5 of Fig. 4;

Fig. 6 is an enlarged fragmentary section taken substantially on the line 6—6 of Fig. 2, some parts being removed; and Fig. 7 is a fragmentary section taken substantially on the line 7—7 of Fig. 2.

Our novel air conditioning unit is particularly adapted for use in air conditioning the interiors of automotive vehicles, preferably the driver's compartment or cab of commercial vehicles such as trucks, tractors for semi-trailers, and the like. Preferably, and as shown particularly in Figs. 1 and 2, our air conditioning unit is adapted to be mounted on the curved top wall or roof of the cab of the vehicle and anchored thereto. In Fig. 1, such an automotive vehicle is indicated in its entirety by the numeral 1, the semitrailer 2 being drawn by a tractor 3, the cam roof of which is indicated at 4. It will be appreciated that our air conditioning unit may be mounted on any suitable wall, but in most cases the roof 4 is most convenient, inasmuch as it affords a broad base of support for the unit, and the unit there situated does not add materially to the space requirements of the vehicle.

Our novel air conditioning unit is incased within a housing 5 having a perforate grill equipped front wall 6, a rear wall 7, a top wall 8, opposed side wall elements 9 hinged at their upper ends to the top wall element 8, as indicated at 10, and a bottom or base frame 11. A condenser 12 is mounted on the base frame 11 behind the grill 6 and adjacent one side thereof, and a motor 13 is mounted on the base frame 11 behind the condenser 12. The motor 13 may be of any well-known type and is preferably in the nature of a relatively small internal combustion engine of the air-cooled variety. Mounted on the drive shaft, not shown, of the engine 13 is a drive pulley 14 and a fan 15, the latter being disposed directly behind the condenser 12 and adapted to draw air rearwardly through the grill portion 6 in front of the condenser 12 and through the condenser. The engine 13 further drives a conventional compressor unit 16 which is shown as being mounted at the rear end of the motor 13 and which may be assumed to be coupled to the drive shaft thereof. An evaporator 17, preferably of the tube and fin variety, is shown as being contained within the housing in laterally spaced relation to the condenser 12, engine 13 and compressor 16. The aforementioned elements of the air conditioning mechanism do not in themselves comprise the instant invention, nor do the various valves and other components through which the refrigerant flows, these being well-known in the art. Hence, and for the sake of brevity, further detailed showing and description of such components is omitted.

The evaporator 17 is contained within a casing 18 that is mounted on the base frame 11 within the housing 1, said casing comprising top and bottom wall elements 19 and 20 respectively, inner and outer wall elements 21 and 22 respectively and front and rear walls 23 and 24 respectively. An evaporator 17 is supported on a tray or shelf 25 which extends from the front wall 23 to the rear wall 24 of the casing 18 and, with the evaporator 17, divides the evaporator chamber indicated generally by the numeral 26, defined by the casing 18, into inlet and outlet chamber sections 27 and 28. A blower indicated in its entirety by the numeral 29 is mounted in the outlet chamber section 28 and includes a sirocco-type rotary fan element 30 that is mounted on a shaft 31 journaled at one end in a bearing 32 in the end wall 24, and at its front end portion in a similar bearing 32 mounted on a portion of the front end wall 23, indicated at 23a. The fan 30 is driven by the motor 13 through a pulley or sheave over which, and the pulley 14, runs an endless drive belt 34. Preferably and as shown, the blower 29 is provided at its opposite ends with air inlet ports 35, and is adapted to discharge air outwardly of the outlet chamber 28 through an outlet 36, see Fig. 4. The bottom portion 21a of the side wall 21 defines an inlet port 37 for admission of air to the inlet chamber section 27 of the evaporator casing 18.

Rigidly anchored, such as by welding or the like to the bottom of the base frame 11, is a plate-like member 38 that is formed to provide a pair of angularly disposed tubular flanges 39 and 40. A flexible conduit 14 is telescopically received over the upper end of the tubular flange 39, and has its other end connected to the outlet 36 of the outlet chamber section 28. A second flexible conduit 42 has one end connected to the tubular flange 40 and its opposite end connected to the inlet passage 37 leading to the inlet chamber section 27. A short tubular neck or head 43 is mounted to the plate-like member 38 by means of nut-equipped bolts or the like 44 and is adapted to project downwardly through an enlarged opening 45 in the compartment wall or roof 4 of the cab 3. With reference to Fig. 2 it will be seen that the opening 45 is of sufficiently greater size than the diameter of the head 43 so that substantial clearance is provided for the tubular head 43. A generally cylindrical rubber-like bellows-shaped sealing member 46 has its upper end terminating in an inturned annular flange 47 that is interposed between the upper marginal edge of the tubular head 43 and the plate-like member 38. The lower end of the sealing member 46 is formed to provide a radially outwardly projecting annular flange 48 that is bolted or otherwise rigidly secured to the top surface 49 of the roof 4 radially outwardly of the opening 45 whereby to seal the opening 45 against passage of air, dust and moisture from the exterior of the cab 3. As shown in Fig. 2, the flange 48 is held against the exterior surface 49 of the roof 4 by a plurality of circumferentially spaced nut-equipped bolts 50, which bolts also serve to anchor an annular mold 51 to the interior surface 52 of the roof 4. The molding 51 is sufficiently resilient to permit limited movement of the tubular head 38 in the opening 45, the primary purpose of the molding 51 being ornamental.

The tubular head 43 is provided with an integrally formed diametrically extended partition element 53 which divides the head into an air delivery passage 54 communicating with the outlet chamber section 28 through the conduit 41, and a return passage 55 which communicates with the inlet chamber section 27 through the conduit element 42. The head 43 is provided with a bottom wall 56 which defines a grilled inlet port 57 and a pair of laterally spaced outlet ports 58. Said outlet ports 58 are each provided with a short tubular supplemental head element 59 that are rotatable with respect to the tubular head 43 on axes parallel to the axis of the tubular head 43. With reference particularly to Figs. 6 and 7 it will be seen that the supplemental head elements 59 are each provided at their lower ends with angularly disposed louvers 60 which direct conditioned air into the compartment angularly with respect to the axis of the tubular head 43. The supplemental heads 59 have reduced upper ends 61 that are receivable in the ports 58, and define shoulders 62 that limit upward movement of the supplemental heads 59 with respect to the tubular head 43. Each of the supplemental heads 59 is provided with a nut-equipped axially extended stud 63 that extends through the intermediate portion of one of a pair of leaf springs 64, each of which yieldingly biases its respective supplemental head 59 into engagement of the shoulder 62 thereof with the adjacent portion of the bottom wall 56 of the tubular head 43. Obviously, rotation of the supplemental heads 59 will cause conditioned air passing downwardly between the louvers 60 to be guided in any desired direction within the cab of the vehicle 3.

Means for mounting our novel air conditioning unit on the cab roof 4 of the tractor 3 comprises a plurality, preferably four, of resilient rubber-like mounting feet 65 and nut-equipped anchoring bolts 66 which extend downwardly from the base frame 11, axially through the resilient feet 65, and through openings 67 in the roof 4. The mounting feet 65 are formed to provide diametrically reduced planar top faces 68 and diametrically enlarged concave bottom faces 69. The marginal edge of each mounting foot 65 lies in a plane angularly disposed to the plane of the top face 68. Thus, rotation of each foot 65 on the axis of its respective mounting bolt 66 will cause the concave bottom surface 69 to be moved into a generally parallel relationship with the underlying portion of the top roof surface 49, after which the nut-equipped bolts associated with the adjusted foot 65 may be tightened to firmly anchor the unit in place on the cab roof 4. With this arrangement, we have found that our air conditioning unit may be quickly and easily mounted in a secure manner on the cab roofs of various tractors of different makes and having different roof contours. Normally, and as indicated by dotted lines in Fig. 2, the concavity of the lower faces 69 of the resilient mounting feet 65 is such that the marginal edges of the lower faces 69 engage the top surface 49 of the roof 4, particularly when the bolts 66 are tightened. With this arrangement, the weight of the air conditioning unit is supported by a relatively large area of the roof 4 and distortion of the roof 4 by weight of the unit is substantially eliminated.

The motor 13 which, as above indicated, is preferably of the internal combustion engine variety, may be assumed to be provided with the usual starting motor, carburetor, and ignition system, not shown. It may be assumed that these elements are contained within the housing 5, and that a fuel line and an electrical power supply for the ignition system and starting motor are adapted to be coupled to the engine 13 and a source of supply, such as a fuel tank and a battery on the vehicle exterior of the cab thereof. An important feature of our invention is the arrangement of controls for the ignition, starting motor and carburetor of the engine, and other control means hereinafter to be described. Mounted on the bottom wall 56 of the tubular head 43 within the outlet passage 54 thereof are a motor starting switch 70, and an ignition switch 71, the former being provided with a switch button 72, and the latter with a toggle-acting handle 73, both of which project downwardly from the bottom wall 56. A flexible shaft 74 is longitudinally slidably contained in a tubular casing 75 that is anchored at one end to the bottom wall 56 of the head 43 as indicated at 76, the adjacent end of the flexible shaft 74 terminating in a control button 77 exterior of the wall 56. Although not shown, it may be assumed that the flexible shaft 74 extends to the throttle control of the engine carburetor so that the speed of the engine 13 may be governed by manipulation of the control button 77. With reference particularly to Fig. 4 it will be seen that the flexible cable 74 together with its sheath or covering tube 75 extends upwardly through the plate-like member 38 in laterally outwardly spaced relation to the tubular flange 39 to the interior of the housing 5 from whence it extends to the throttle valve or governor associated with the carburetor of the engine 13. The electrical leads extend from the starting motor switch 70 and ignition switch 71 to the elements controlled thereby through a cable or guide tube 78 that extends upwardly through the plate-like member 38 in laterally outwardly spaced relation to the tubular flanges 39 and 40, see particularly Fig. 4.

With the above described unit, when the engine 13 is started by closing of the ignition switch 71 and the starting motor switch 70, and caused to operate at the desired speed by manipulation of the throttle control knob 77, the blower 29 will draw air through the evaporator 17 and move the same downwardly through the conduit 41 and the outlet passage 54 and louvered head elements 59 to the interior of the cab of the tractor 3; and from thence air will move upwardly through the passage 55 and conduit 42 to the inlet chamber section 27 and through the evaporator 17. Thus, with the cab of the tractor 3 in a closed condition, the same air is recirculated through the cab or driver's compartment, and through the evaporator 17. It is often desirable that a certain amount of fresh air be drawn into the air stream as it is circulated between the air conditioner and the cab interior, and it is important that admission of such fresh air be under control of the operator. We therefore provide a generally rectangular opening in the front wall 23 of the casing 18, such opening being indicated at 79, see Figs. 3 and 4. The size of the opening 79 is controlled by a closure 80 hinged to the front wall 23 as at 81. One end of a flexible cable 82 is connected to the closure 80 and extends through a tubular casing or sheath 83 downwardly through the plate-like member 38. At its lower end the sheath 83 is provided with a fitting 84 similar to the fitting 76 anchored to the bottom wall 56 of the tubular head 43. The flexible shaft 82 extends downwardly through the wall 56 and is connected to a control knob 85 similar to the control knob 77. Thus, when it is desired that more or less fresh air be introduced into the system, it is but necessary for the operator to pull downwardly or push upwardly on the control knob 85 to the desired extent.

From the above it will be seen that all of the control elements for the air conditioner, which require manipulation by the operator to initiate operation of the air conditioning unit and to adjust the normal running thereof, as well as to shut the system off, are within easy reach of the operator and are contained on the air conditioning unit as integral portions thereof. With this arrangement, it is not necessary that special controls for the air conditioning unit be installed on the instrument panel of the vehicle or at any other location within the driver's compartment. As above indicated, when it is desired to remove the air conditioning unit from the vehicle, it is merely necessary that the fuel line, not shown, but which is usully carried exterior of the cab, and the electrical supply line, be disconnected. Thereafter, the nuts are removed from the anchoring bolts 66 and the entire unit with its self-contained controls is lifted away from the roof 4 of the vehicle. Obviously, a suitable covering is provided for the opening 45 and bolt holes 67 when the tractor is in use without the air conditioner mounted thereon.

Inasmuch as the supplemental head elements 59 are two in number, each independently adjustable with respect to the other, the passenger within the driver's compartment of the vehicle may direct the cooled air coming into the cab from the air conditioner to any desired area within the cab, so that a maximum of comfort is obtained. By utilizing the above described structure, it has been found that a marked increase in driver efficiency together with a substantial decrease in travel fatigue is obtained when the vehicle is traveling in warm climates and during the summer season when the weather is uncomfortably warm. Our novel unit has been found to be particularly desirable when used with heavy trucks or trailer tractors of the cab-over-engine variety, wherein engine heat tends to make the cab temperature uncomfortably warm during summer travel.

Our invention has been thoroughly tested and found to be completely satisfactory for the accomplishment of the objectives set forth; and while we have shown and described a commercial embodiment of our novel device and arrangement, it will be understood that the same is capable of modification without departure from the spirit and scope of the invention as defined in the claims.

What we claim is:

1. In an air conditioning device for automotive vehicles, a housing including a base frame, means for anchoring said base frame to the top surface of a vehicle passenger compartment roof, said means comprising a plurality of resilient feet adapted to conform to the contour of said upper roof surface and anchoring screws extending downwardly through said feet and adapted to project through spaced openings in said roof, said air conditioner including, an evaporator, a blower, and a motor for said blower supported on said base frame within the housing, a short tubular head secured to the base frame and extending downwardly therefrom, said head being adapted to project loosely downwardly through an enlarged opening in said vehicle roof and in spaced relation to the marginal edge of the roof defining said opening, a resilient tubular sealing member loosely encompassing said head and secured at its upper end to said base frame, the lower end of said sealing member being adapted to be secured in sealing engagement with the upper surface of said roof radially outwardly of said enlarged opening, whereby to permit limited movement of said base frame and head relative to said roof and to seal said enlarged opening in the roof against passage of air therethrough around said tubular head, said tubular head defining a conditioned air delivery passage to said compartment and a return air passage therefrom, conduit means within said housing connecting said air delivery passage to one side of said evaporator and connecting said return passage to the opposite side of said evaporator, said blower being interposed between a portion of said conduit means and said evaporator, and control means for said motor and including manually operated control elements mounted on the projected end of said head and control connections extending into said housing to said motor from the interior of said head and exterior of said conduit means.

2. In an air conditioning device for automotive vehicles, a housing including a base frame, means for anchoring said base frame to the curved top surface of a vehicle passenger compartment roof, said means comprising a plurality of laterally spaced resilient feet having planar top faces engaging the bottom of said base frame and concave lower faces adapted to engage the curved top surface of said roof, the margins of said lower faces lying in planes angularly disposed relative to the planes of the top faces thereof, and anchoring screws extending axially through said feet and adapted to project through spaced openings in said roof and permitting rotation of said feet on the axis thereof with respect to said base frame and roof, said air conditioning device including, an evaporator, a blower, and a motor for said blower supported on said base frame within said housing, a short tubular head secured to said base frame and extending downwardly therefrom in laterally inwardly spaced relation to said feet, said tubular head being adapted to project downwardly through an opening in said roof and defining a conditioned air delivery passage to said compartment and a return air passage therefrom, conduit means within said housing connecting said air delivery passage to one side of said evaporator and connecting said return passage to the opposite side of said evaporator, said blower defining a portion of said conduit means, and control means for said motor and including manually operated control elements mounted on the projected end of said head and control connections extending into said housing to said motor from the interior of said head and exterior of said conduit means.

3. In an air conditioning device for automotive vehicles, a housing including a base frame, means for anchoring said base frame to the exterior surface of a wall of the passenger compartment of a vehicle, said air conditioning device including, an evaporator, a blower, and a motor for said blower supported on said base frame within the housing, a short tubular head secured to said base frame and extending laterally outwardly therefrom, said tubular head being adapted to project through an opening in said passenger compartment wall and defining a conditioned air delivery passage to said compartment and a return air passage therefrom, conduit means within said housing connecting said air delivery passage to one side of said evaporator and connecting said return passage to the opposite side of said evaporator, said blower defining a portion of said conduit means, a pair of spaced supplemental head elements having louvered delivery ports for passage of conditioned air from said delivery passage to said compartment, said head elements being mounted on the projected end of said tubular head for independent rotation about spaced axes parallel to the axis of said head, whereby conditioned air from said evaporator is guided angularly to the axis of said head and in desired directions in said compartment, and control means for said motor and including manually operated control elements mounted on the projected end of said tubular head in laterally spaced relation to said head elements, and control connections extending into said housing to said motor from the interior of said head and exterior of said conduit means.

4. In an air conditioning device for automotive vehicles, a housing including a base frame, means for anchoring said base frame to the top surface of a vehicle passenger compartment roof, said means comprising a plurality of resilient feet adapted to conform to the contour of said top surface and anchoring screws extending downwardly through said feet and adapted to project through spaced openings in said roof, said air conditioner including, an evaporator, a blower, and a motor for said blower supported on said base frame within the housing, a short tubular head secured to the base frame and extending downwardly therefrom, said tubular head being adapted to project downwardly through an opening in said roof and defining a conditioned air delivery passage to said compartment and a return air passage therefrom, conduit means within said housing connecting said air delivery passage to one side of said evaporator and connecting said return passage to the opposite side of said evaporator, said blower defining a portion of said conduit means, and control means for said motor and including manually operated control elements mounted on the projected end of said head and control connections extending into said housing to said motor from the interior of said head.

References Cited in the file of this patent
UNITED STATES PATENTS

| | | |
|---|---|---|
| Re. 23,000 | Jones | May 11, 1948 |
| 2,182,569 | Peo | Dec. 5, 1939 |
| 2,475,841 | Jones | July 12, 1949 |
| 2,737,788 | Buttner | Mar. 13, 1956 |
| 2,780,928 | Bullock | Feb. 12, 1957 |